United States Patent [19]

Landry

[11] 4,100,441
[45] Jul. 11, 1978

[54] MAGNETIC TRANSMISSION

[76] Inventor: Alfred Landry, 7589 Caluveado St., Lemon Grove, Calif. 92045

[21] Appl. No.: 779,159

[22] Filed: Mar. 18, 1977

[51] Int. Cl.² .......................................... H02K 49/06
[52] U.S. Cl. ..................................... 310/103; 310/152
[58] Field of Search ................. 310/103, 266, 152, 46, 310/154, 172

[56] References Cited

U.S. PATENT DOCUMENTS

| 3,235,761 | 2/1966 | Nohen | 310/172 |
|---|---|---|---|
| 3,287,676 | 11/1966 | Davis et al. | 310/154 X |
| 3,864,587 | 2/1975 | Landry | 310/103 |
| 3,895,245 | 7/1975 | Bode | 310/103 X |

FOREIGN PATENT DOCUMENTS

| 204,831 | 1/1957 | Australia | 310/266 |

Primary Examiner—Donovan F. Duggan
Attorney, Agent, or Firm—Frank D. Gilliam

[57] ABSTRACT

The improved magnetic transmission having an armature mounted to rotate about an axis of rotation. Each of a plurality of permanent magnets carried by the armature are magnetically oriented with each adjacent magnet having opposite magnetic polarities. Each of a plurality of drive motor permanent magnets is rotatably mounted at a fixed radial position with respect to the armature axis of rotation and is disposed in magnetic proximity with respect to the permanent magnets carried by the armature. An external power source is provided for driving all of the drive motor permanent magnets at a common speed and in a common direction. Each of the drive rotor permanent magnets is magnetically oriented for rotating the armature at a speed that is proportional to the rotating speed of the drive rotor permanents. The rotation of the drive rotor magnet pulls the armature magnets in a direction opposite thereto after an initial magnetically locked condition is overcome by the external power source. Diamagnetic material is positioned between the drive rotor magnets and the armature permanent magnets to cancel a portion of the magnetic force causing the initial magnetically locked condition.

3 Claims, 2 Drawing Figures

MAGNETIC TRANSMISSION

BACKGROUND OF THE INVENTION

The present invention relates generally to magnetic transmissions, and more particularly to improving the efficiency of a magnetic transmission utilizing a plurality of driven magnetic rotors for rotating a magnetic armature mounted co-axially therewith as fully described in U.S. Pat. No. 3,864,587 by the inventor of the instant invention. The patented invention was found to have undesirable magnetic forces present between the armature permanent magnets and the driven magnetic that resists the rotation of the armature during a portion of the rotational relationship between adjacent rotating magnets and armature magnets.

SUMMARY OF THE INVENTION

The instant invention provides an improvement to the apparatus of the aforementioned United States Patent. The improvement provides a reduction of the resistive forces present during a portion of the rotational relationship between the adjacent rotating rotor permanent magnetics and the driven magnets by shielding the magnetic forces bewteen the adjacent magnets during that period of time that their combined magnetic forces resist the free rotation of the rotor.

The principal object of this invention is to improve the efficiency of magnetic transmission of the type covered by the aforementioned United States Patent.

The foregoing and various other features of the invention will appear in the course of the description which is rendered with reference to the accompanying drawings.

DESCRIPTION OF THE PREFERRED EMBODIMENT

Figure 1:
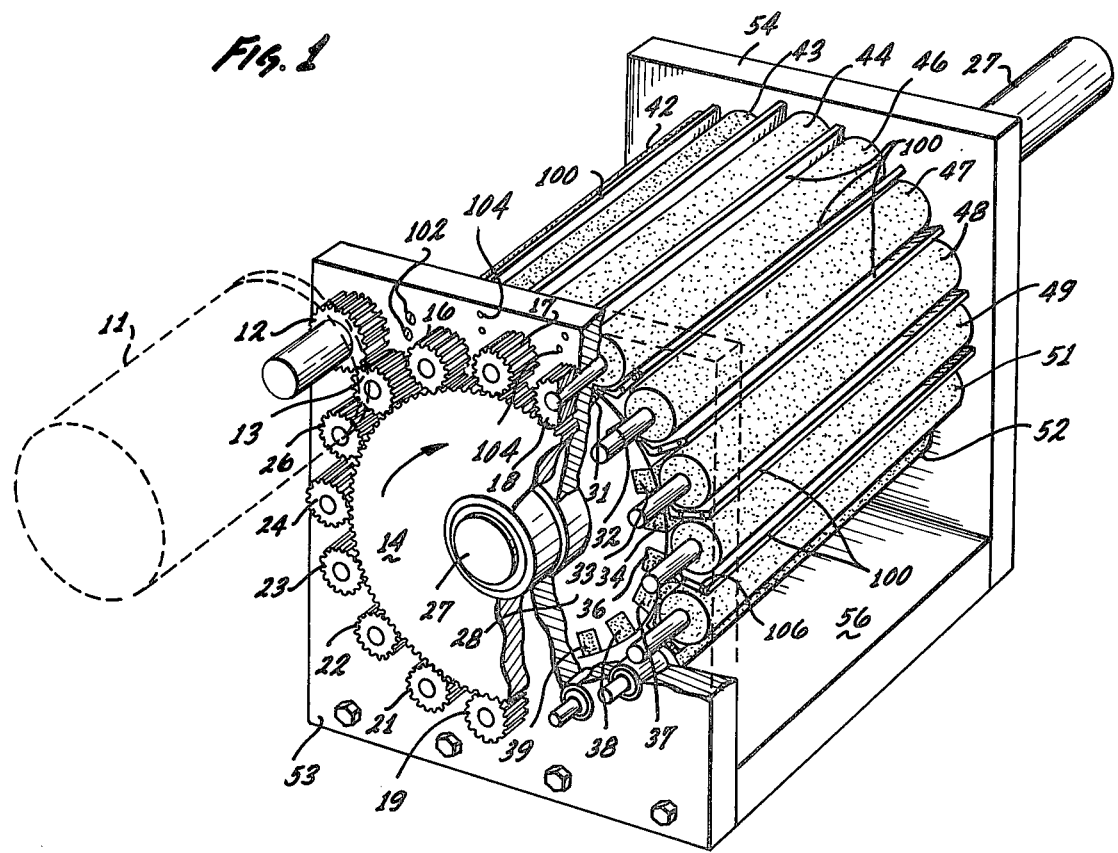
FIG. 1 is a fragmentary perspective view, partially sectioned of a magnetic transmission having the improvement in accordance with this invention.

The apparatus utilizing the improvement of the instant invention is fully explained and described in the aforementioned United States Patent, therefore, only a short description of the apparatus is hereinafter described.

The same reference numerals used throughout the specification and drawings of the instant application and the aforementioned United States Patent depicts the same part or element.

Referring now to FIG. 1, input and speed control motor 11, shown in phantom, is coupled to drive gear 12 which in turn engages pinion gear 13. Pinion gear 13 engagingly drives ball gear 14 which in turn engagingly drives pinion gears 16, 17, 18, 19, 21, 22, 23, 24 and 26. Bull gear 14 is rotatably carried by output shaft 27. That is, bull gear 14 rotates independently from the rotation of shaft 27. Any known mechanism may be used to accomplish the desired result.

A non-magnetic armature 28 is fixedly mounted on output shaft 27 and carries permanent magnets 31, 32, 33, 34, 36, 37, 38 and 39 disposed circumferentially therearound along with the remaining armature magnets (not shown). As shown, the permanent magnets are isolated with respect to each other by non-magnetic material. Drive rotor magnets 42, 43, 44, 46, 47, 48, 49, 51 and 52 are rotatably mounted between vertical sections 53 and 54 that are bolted to base frame member 56. Drive rotors 42, 43, 44 and 46 carry pinion gears 13, 16, 17 and 18, respectively. Each drive rotor is associated with and carries each of the pinion gears 13 and 16 through 26 as shown in FIG. 1. When control motor 11 rotates drive gear 12, all of the drive rotors disposed a fixed radial distance with respect to the axis of rotation of armature 28 will rotate in the same direction.

The various numbers of drive rotor magnets and permanent magnets carried by the armature are set forth in detail in the aforementioned United States Patent.

Figure 2:
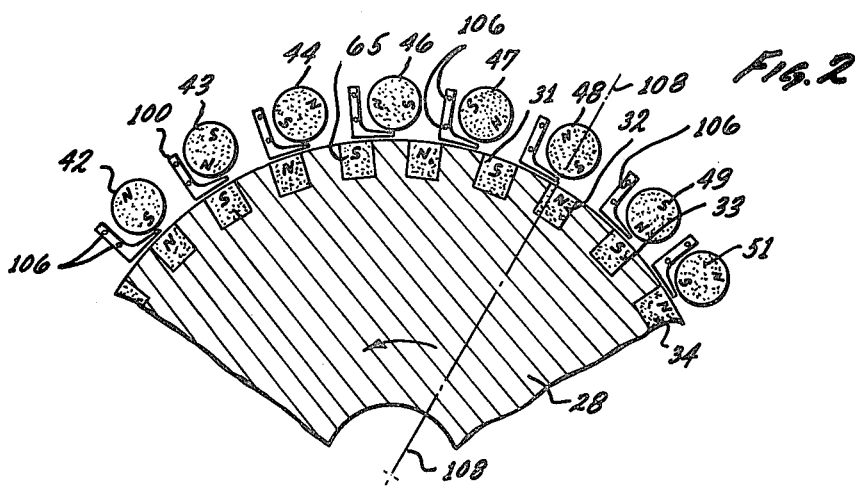
FIG. 2 is a cross-sectional view showing the rotor, rotor permanent magnets, the rotating permanent magnets and the diamagnetic material.

Connected between the vertical sections 53, 54 adjacent each of the drive rotor magnets is a bracket 100 having generally an "L" shaped cross-section. The upper portion of the "L" being secured to the section 53, 54 by any suitable means, such as, screws 102 passing through apertures 104 (only the front fasteners and apertures shown) threaded into aperture 106 in brackets 100. It should be understood that any other convenient means may be utilized to position the brackets 100 with respect to the permanent magnets carried by the armature and the drive rotor permanent magnets. The lower "L" portion of the bracket should be positioned as close to its associated drive rotor permanent magnets and armature carried permanent magnets as practical and still be clear of contact therewith. The outer end of the lower "L" portion of the bracket 100 should extend to a position substantially adjacent a plane 108 passing through the center of each of the drive rotor permanent magnets and the center of the rotor. The "L" bracket is either constructed of diamagnetic material or base metal plated or covered with diamagnetic material. Examples of diamagnetic material includes, but should not be limited to, copper, zinc, germanium, silver, gold and bismuth. Of the aforementioned group, bismuth is the most satisfactory. The aforementioned positioning of the bracket 100 provides maximum aiding force and minimum resistance force between the drive rotor magnets and the permanent magnets carried by the armature. The positioning of the "L" brackets in FIG. 1 reduces the force required from speed control motor 11 during clockwise rotation of the armature and the FIG. 2 positioning reduces the force required from speed control motor 11 during counter-clockwise rotation of the armature.

The device operates in the same manner as described in the predominent U.S. Pat. No. 3,864,587 except that at least a portion of the magnetic forces resistive to the rotation of the armature by the drive motor are eliminated by the diamagnetic material of "L" bracket 100 resulting in a reduction of the force required by the speed control drive motor to operate the armature at a given speed of rotation.

It will be understood that changes and modifications may be made to the structure described above without departing from the spirit and scope of the invention as set forth in the claims appended thereto.

Having thus described the invention, what is claimed as new and useful and described to be secured by United States Letters Patent is:

1. An improved magnetic transmission having an output shaft, a free-rotating armature carried by the output shaft, a plurality of permanent magnets carried by said armature, said permanent magnets carried by said armature being magnetically oriented with each adjacent magnet having opposite magnetic polarities, a plurality of drive rotor permanent magnets rotatably mounted on an axis, each drive rotor axis having a fixed radial position with respect to the output shaft and disposed in magnetic proximity with said permanent magnets carried by the armature, and an input drive means coupled to said rotor permanent magnets for rotating said drive rotor permanent magnets in a synchronous relationship, said drive rotor permanent magnets being magnetically oriented for rotating the armature at a speed proportional to the rotating speed of said drive rotor permanent magnets, said permanent magnets carried by the armature and said drive rotor permanent magnets being disposed in discrete sectors in 360°, said permanent magnets carried by the armature having an odd number in each sector and the drive rotor magnets have one less than the odd number in each sector, said improvement comprising, diamagnetic material positioned between each of said drive rotor permanent magnets and said armature and closely related thereto for diminishing at least a portion of the magnetic forces between said rotor permanent magnets and said permanent magnets carried by said armature, said diamagnetic material is positioned so that only the magnetic force between each of said permanent magnets opposing the rotational direction of said armature is effected.

2. The invention as defined in claim 1, wherein said diamagnetic material is bismuth.

3. The invention as defined in claim 1, wherein said diamagnetic means extends to a position substantially adjacent a plane passing through the center of its associated drive rotor magnet and said free rotating armature.

* * * * *